United States Patent

[11] 3,607,828

| [72] | Inventor | Edward Walter Hussey<br>Orange, Tex. |
|---|---|---|
| [21] | Appl. No. | 12,849 |
| [22] | Filed | Feb. 1, 1970 |
| [45] | Patented | Sept. 21, 1971 |
| [73] | Assignee | E. I. du Pont de Nemours and Company<br>Wilmington, Del. |

[54] ULTRA VIOLET STABILIZED POLYOLEFINS
6 Claims, No Drawings

[52] U.S. Cl. .................................................... 260/41 R,
260/41 B, 260/41 C, 260/45.75 N, 260/45.8 NZ,
260/45.85, 260/45.95, 260/897 A

[51] Int. Cl. ....................................................... C08f 45/02,
C08f 45/60

[50] Field of Search .......................................... 260/45.75
N, 45.95, 897 A, 45.85, 45.8 N, 45.8 O, 41 B, 41 C

[56] References Cited
UNITED STATES PATENTS

| 3,098,842 | 7/1963 | Armitage et al. ............. | 260/45.95 |
|---|---|---|---|
| 3,325,441 | 6/1967 | McNally ....................... | 260/41 |

FOREIGN PATENTS

| 889,690 | 6/1962 | Great Britain ................ | 260/45.75 |

*Primary Examiner* — Donald E. Czaja
*Assistant Examiner* — V. P. Hoke
*Attorney* — Earl L. Handley

ABSTRACT: Polyolefins stabilized against ultra violet light with nickel dialkyl dithiocarbamates and 2-hydroxy-4-octyloxybenzophenone.

ULTRA VIOLET STABILIZED POLYOLEFINS

This application is a continuation-in-part of my copending application SER. NO. 637,361, filed on May 10, 1967 now abandoned.

invention relates to polyolefin composition stabilized with a mixture of nickel dialkyl dithiocarbamate and 2-hydroxy-4-octyloxybenzophenone.

Nickel alkyl dithiocarbamate is a known additive to polyolefins for the purpose of stabilizing the composition against ultra violet light. See British PAT. NO 889,690, issued June 13, 1962. 2 -hydroxy-4-octyloxybenzophenone is also a known additive to polyolefins for the purpose of stabilizing the compositions against ultra violet light. See U.S. PAT. NO. 3,098,842, issued July 23, 1963.

It has now been found that if a nickel dialkyl dithiocarbamate is used in combination with 2-hydrozy-4 -octyloxybenzophenone in a normally solid polyolefin, the polyolefin is more stable against the effects of ultra violet light than when the same total amount of either stabilizer is used alone. In other words, the combination acts synergistically to stabilize the polyolefin.

This synergistic activity is limited to nickel dialkyl dithiocarbamates in which each alkyl group contains 4, 5, or 6 carbon atoms, when used in combination with only one hydroxybenzophenone compound, namely 2-hydrozy-4-octyloxybenzophenone. The synergistic activity is also limited to combinations of these stabilizers in which the nickel dialkyl dithiocarbamate is present in an amount on weight basis at least about equal to 50 percent of the combination and not more than about .95 percent by weight of the combination. Stated on a weight ratio basis, the ratio of nickel dialkyl dithiocarbamate to 2-hydroxy-4-octyloxybenzophenone will vary from about 1:1 to 20:1. The optimum ratio will depend upon the presence or absence of other components such as pigments, fillers and the like in the resin. Such pigments and fillers are often added in amounts ranging up to 30 percent by weight of the composition. The optimum ratio will vary somewhat depending on the particular color of the pigment employed. Pigmented polyolefin compositions are generally more ultra violet light stable than nonpigmented polyolefin compositions.

This ultra violet light stabilizer combination may be used in conjunction with other types of stabilizers, for example, thermal stabilizers such as 2,6-ditertiary butyl-p-cresol; N-(p-hydroxphenyl) morpholine; tri-tert-butyl phenol; 4,4'-butylidene-bis-(6-tert-butyl-m-cresol); 2,2'-methylenebis (4-methyl-6-tert-butyl phenol); phenol); 2,4,6-tris-(3,5dimethyl-4-hydroxybenzyl) mesitylene; and dialkyl thiodipropionates such as disclosed in Gribbins U.S. Pat. No. 2,519,755. These thermal stabilizers may be used in amounts ranging from about 0.001 to about 1.0 percent by weight of the polyolefin. These thermal stabilizers do not affect the ultra violet light stability of the compositions, but would be normally added to commercial resins to protect them during fabrication.

The total amount of stabilizer combination added may vary over wide limits; however, an amount in the range of about 0.01 to 1.0 percent by weight of the polyolefin is generally satisfactory for most uses. An amount in the upper end of this range would be selected for maximum long term stabilization.

The polyolefin stabilized by the combination can be any normally solid polyethylene (branched or linear), polypropylene, copolymers of ethylene and *l*-olefins of more than 2 carbon atoms, copolymers of propylene and *l*-olefins of more than 3 carbon atoms, as well as blends of these polyolefins with each other or other polymeric materials.

In the following examples which illustrate the invention all parts and percentages are in parts by weight unless otherwise specified.

EXAMPLES I–III

A linear polyethylene homopolymer having a melt index of 17.5 g/10 min. (ASTM D–1238–52T) and a density of 0.971 containing 225 parts per million 2,6ditert-butyl-p-cresol and 0.04 percent Monastral Green pigment, 0.18 percent cadmium yellow pigment, and 0.06 percent titanium dioxide pigment and 0.1 percent by weight of the combination of stabilizers in the ratios shown in the following table, was obtained by blending the ingredients on a 2-inch extruder at 180° C. Thereafter, the blended resin was injection molded into lids 0.055 inches thick from which strips were cut for tensile testing. The strips were 3.5 inches long and 2 inches wide. The strips were then exposed to an Atlas XW Weather-O-Meter with a Corex D filter. The exposure cycle was 18 minutes in water spray and 102 minutes dry at about 60° C. In accordance with ASTM Method E–42–57.

The samples were removed from the Weather-O-Meter, dried, allowed to come to equilibrium at 23° C. and then tested for tensile strength and elongation by ASTM Method D–1238–57-T. The Table records the number of hours it took for the samples to deteriorate to zero percent elongation.

TABLE I

| Example No. | Ratio NBC*/HOBP** | Color | Time to 0% Elongation (hr.) |
|---|---|---|---|
| (Control 0.1% NBC) | | Green | 900 |
| 1 | 1 | do | 1150 |
| 2 | 3 | do | 1350 |
| 3 | 5 | do | 1500 |

*NBC is nickel dibutyl dithiocarbamate
**HOBP is 2-hydroxy-4-octyloxybenzophenone

EXAMPLES IV–VI

Test specimens of the same polyethylene resin as employed in examples I –III were prepared with 0.25 percent (by weight) of the stabilizer combination in the ratios shown in the following table under the conditions of examples I –III except that no pigment was added, and the specimens tested with the following results:

TABLE II

| Example No. | Ratio NBC*/HOBP** | Color | Time to 0% Elongation (hr.) |
|---|---|---|---|
| (Control no stabilizer) | | Neutral | 150 |
| (Control .25% NBC) | | do | 3000 |
| (Control 0.25% HOBP) | | do | 2000 |
| 4 | 1 | do | 3000 – |
| 5 | 3 | do | 3000 – |
| 6 | 5 | do | 4000 |

*NBC is nickel dibutyl dithiocarbamate.
**HOBP is 2-hydroxy-4-octyloxybenzophenone.

EXAMPLES VII–IX

Test specimens of the same polyethylene resin as Examples I –III were prepared with 0.5 percent of the combination of stabilizers in the ratios shown in table III under the conditions shown in examples I –III, except that 0.04 percent Monastral Violet, 0.119 percent Watchung Red B, 1.43 percent Molybdate Orange was added, and the specimens were tested with the following results:

TABLE III

| Example No. | Ratio NBC*/HOBP** | Color | Time to 0% Elongation (hr.) |
|---|---|---|---|
| (Control .5% NBC) | | Red | 3000 |
| 7 | 1 | do | 4000 + |
| 8 | 3 | do | 4000 |
| 9 | 5 | do | 4000 |

*NBC is nickel dibutyl dithiocarbamate.
**HOBP is 2-hydroxy-4-octyloxybenzophenone.

EXAMPLES X–XII

Test specimens of the same polyethylene resin as that of examples I –III containing 0.022 percent 2,6-di-t-butyl- p-cresol were prepared with 0.25 percent of the combination of stabilizers in the ratios shown in table IV under the conditions of specimens I –III, except that instead of the pigments which were included in examples I –III, the following pigments, in their respective proportions were added: Monastral Blue pigment 0.04 percent); Monastral Green pigment 0.07 percent; and titanium dioxide 0.24 percent. The test results were as follows:

TABLE IV

| Example No. | Ratio NBC*/HOBP** | Time to 0% Elongation (hr.) |
|---|---|---|
| (Control no stabilizer) | | 210 |
| (Control 0.25% NBC) | | 3100 |
| (Control 0.25% HOBP) | | 2300 |
| 10 | 1 | 4000 |
| 11 | 3 | 3500 |
| 12 | 5 | 3300 |

*NBC is nickel dibutyl dithiocarbamate.
**HOBP is 2-hydroxy-4-octyloxybenzophenone.

EXAMPLES XIII–XVIII

Test specimens of the same polyethylene resin initially without any additives as that of examples I–III were prepared with the various combinations of stabilizers listed in table I under the conditions of examples I–III, except that no pigment was added, and the specimens were tested as examples I–III with the following results:

TABLE V

| Example No. | Additive | Percent of additive | Time to 0% elongation (hours) |
|---|---|---|---|
| Control | No additive | | 140 |
| Control | 2,6-ditert-butyl-p-cresol | 0.02 | 150 |
| 13 | HOBP² | 0.1 | 470 |
| 14 | {2,6-ditert-butyl-p-cresol / HOBP²} | 0.02 / 0.1 | 500 |
| 15 | NBC¹ | 0.1 | 900 |
| 16 | {2,6-ditert-butyl-p-cresol / NBC¹} | 0.02 / 0.1 | 900 |
| 17 | {NBC¹ / HOBP²} | 0.05 / 0.05 | 1,175 |
| 18 | {2,6-ditert-butyl-p-cresol / NBC¹ / HOBP²} | 0.02 / 0.05 / 0.05 | 1,150 |

¹ NBC is nickel dibutyl dithiocarbamate.
² HOBP is 2-hydroxy-4-octyloxybenzophenone.

EXAMPLES XIX–XXIV

Test specimens were prepared by blending on a roll mill at 165° C. a coordinate copolymer of ethylene and 0.20 percent by weight l-octene which had a melt index of 0.45 grams/ 10 minutes ASTM-D-1238-52T and a density of 0.95 grams/cc. with the additives depicted in table VI in the concentrations depicted in table VI, and then compression molding the blends into plaques 0.040 inches thick, 3.5 inches long and 2 inches wide. The plaques were tested following the procedure of example I–III with the results indicated in table VI.

TABLE VI

| Example No. | Additive | Percent of additive | Time to 0% elongation (hours) |
|---|---|---|---|
| Control | No additive | | 100 |
| 19 | HOBP² | 0.1 | 600 |
| 20 | {TDM³ / HOBP²} | 0.02 / 0.1 | 600 |
| 21 | NBC¹ | 0.1 | 750 |
| 22 | {TDM³ / NBC¹} | 0.02 / 0.1 | 750 |
| 23 | {NBC¹ / HOBP²} | 0.05 / 0.05 | 850 |
| 24 | {NBC¹ / HOBP² / TDM³} | 0.05 / 0.05 / 0.02 | 850 |

¹ NBC is nickel dibutyl dithiocarbamate.
² HOBP is 2-hydroxy-4-octyloxybenzophenone.
³ TDM is 2,4,6-tris-(3,5-dimethyl-4-hydroxybenzyl)mesitylene.

I claim:
1. A normally solid polyolefin composition containing as the polyolefin a polymer selected from the group consisting of polyethylene, polypropylene, copolymers of ethylene and l-olefins of more than 2 carbon atoms, copolymers of propylene and l-olefins of more than 3 carbon atoms and blends thereof and a stabilizing amount of a mixture of nickel dialkyl dithiocarbamate and 2-hydroxy-4-octyloxybenzophenone in which the alkyl groups of the nickel dialkyl dithiocarbamate contain 4 to 6 carbon atoms and in which the weight ratio of nickel dialkyl dithiocarbamate to 2-hydrozy-4-octyloxybenzophenone is within the range of about 1:1 to 20:1.

2. The composition of claim 1 in which the stabilizing amount is in the range of about 0.01 percent to 1.0 percent by weight of the polyolefin.

3. The composition of claim 2 in which the alkyl groups on the nickel dialkyl dithiocarbamate are butyl groups.

4. The composition of claim 1 in which the polyolefin is selected from the class consisting of polyethylene and polypropylene and blends thereof.

5. The composition of claim 2 which includes pigment.

6. The composition of claim 1 also containing thermal stabilizers.

PO-1050
(5/69)

UNITED STATES PATENT OFFICE
CERTIFICATE OF CORRECTION

Patent No. 3,607,828     Dated SEPTEMBER 21, 1971

Inventor(s) EDWARD WALTER HUSSEY

It is certified that error appears in the above-identified patent and that said Letters Patent are hereby corrected as shown below:

Col. 2, lines 43 and 44

|  | Specification | 3000 + | patent | 3000 − |
|---|---|---|---|---|
|  | " | 3000 + | " | 3000 − |
| line 62 | " | 4000 + | " | 4000 . |

Signed and sealed this 11th day of July 1972.

(SEAL)
Attest:

EDWARD M. FLETCHER, JR.        ROBERT GOTTSCHALK
Attesting Officer              Commissioner of Patents